United States Patent [19]
Fertik et al.

[11] 3,770,946
[45] Nov. 6, 1973

[54] METHOD FOR AUTOMATIC CONTROL WITH TIME VARYING TUNING

[75] Inventors: Harry A. Fertik, Philadelphia; Charles W. Ross, Hatboro, both of Pa.

[73] Assignee: Leeds & Northrup Company, Philadelphia, Pa.

[22] Filed: Feb. 25, 1971

[21] Appl. No.: 118,793

[52] U.S. Cl. .................. 235/150.1, 318/610, 444/1
[51] Int. Cl. ..................... G05b 11/42, G06f 15/18
[58] Field of Search ..................... 235/150.1, 151.1; 318/609, 610, 615, 616; 444/1

[56] References Cited
UNITED STATES PATENTS

| | | | |
|---|---|---|---|
| 2,946,943 | 7/1960 | Nye et al. ....................... | 318/610 X |
| 3,533,236 | 10/1970 | Cottington ..................... | 318/610 X |
| 3,566,241 | 2/1971 | Ross ............................... | 318/610 X |
| 3,441,836 | 4/1969 | Riley .............................. | 318/610 X |
| 3,391,317 | 7/1968 | Bell ................................ | 318/610 X |
| 3,549,976 | 12/1970 | Bretagne ........................ | 318/610 X |
| 3,584,208 | 6/1971 | Slawson et al. ............... | 235/151.1 X |

OTHER PUBLICATIONS
"Direct Digital Control Algorithm With Anti-Windup Feature," Fertik & Ross, Isa Transactions, Vol. 6 No. 4, Sept. 1967, pp. 317–328.

Primary Examiner—Malcolm A. Morrison
Assistant Examiner—Jerry Smith
Attorney—William G. Miller, Jr. and Raymond F. MacKay

[57] ABSTRACT

A velocity algorithm which provides for proportional, reset and rate control functions without any resulting loss of information under conditions involving the variation of the tuning constants. The proportional component is separately computed as the change with time of the product of the proportional gain and the control error. The reset component is separately computed as the product of the reset gain and the control error while the rate component is also separately computed as the change with time of the product of the rate gain and the change of the control error with time.

13 Claims, 3 Drawing Figures

INVENTORS
HARRY A. FERTIK
CHARLES W. ROSS

BY *William G. Miller Jr.*

AGENT

METHOD FOR AUTOMATIC CONTROL WITH TIME VARYING TUNING

BACKGROUND OF THE INVENTION

Both analog and digital process controllers utilizing velocity algorithms have been devised in the past; however, there has not previously been available a simplified velocity algorithm which would allow for the variation of the controller tunings without a consequent loss in information in the controller output. The velocity algorithm may be considered as that procedure or method, whether described by circuit diagram, mathematical equation or program flow chart, which is designed to provide a signal to an integrating type control device so as to modify, by the operation of the control device, the manipulated variable of the process under control in response to the deviation of the measured variable of the process from its set point. The velocity algorithm is distinguished from the position algorithm in that the position algorithm provides a position signal instead of a velocity signal as an output and the control device is positioned in accordance with that position signal. Both algorithms usually provide the desired combination of the several standard control responses, namely proportional, reset and rate action.

The velocity algorithm has been found to provide ease of computation and the ready incorporation of bumpless transfer from manual to automatic control.

The equation for the discrete, non-interacting process controller with the proportional, reset and rate components being incorporated by discrete computation has been set forth in its continuous form in the prior art as follows:

$$dM/dt = K_1 (de/dt) + K_2 e + K_3 (d^2e/dt^2)$$

where:
$M$ = position of control device.
$K_1$ = proportional gain = proportional coefficient, $K_p$.
$K_2$ = reset gain, $K_p/T_i$.
$K_3$ = rate gain, $K_p T_d$.
and:
$T_i$ = integral time constant.
$T_d$ = derivative time constant.
$e$ = control error.

Similarly, the difference equation for the non-interacting form of the velocity algorithm, as would be suitable for digital computation, has been expressed in the prior art as follows:

$$\Delta M_n = K_1(e_n - e_{n-1}) + K_2 T_c e_n + K_3/T_c (e_n - 2e_{n-1} + e_{n-2})$$

Both analog control systems and digital control systems whose control functions were computed as set forth in the above equations have been inadequate when the tunings for the proportional or rate functions are to change with time whether by manual manipulation or in response to some process variable. Other control systems are similarly inadequate as a result of changes in the reset tuning. The inadequacy involves the loss of information which occurs when the tunings are changed; that is, the control system fails to respond to the change in tunings in accordance with the response which would be appropriate for such a change. This loss of information occurs whenever the control error is not at zero and it causes adverse control effects.

SUMMARY OF THE INVENTION

In carrying out the invention there is provided a method for automatically calculating a control signal input for a control device of the integrating type so as to modify the manipulated variable of the process where there is provided a proportional and reset action in response to the measured variable. The steps of the method involve the automatic calculation of the proportional component of the control signal in accordance with the change per unit of time in the value of the product of the proportional gain and the deviation in addition to the automatic calculation of the reset component of the control signal in accordance with the product of the reset gain and the deviation. After the components are calculated, they are automatically summed to produce the control signal input to the control device.

DESCRIPTION OF THE PREFERRED EMBODIMENT

Figure 1A:
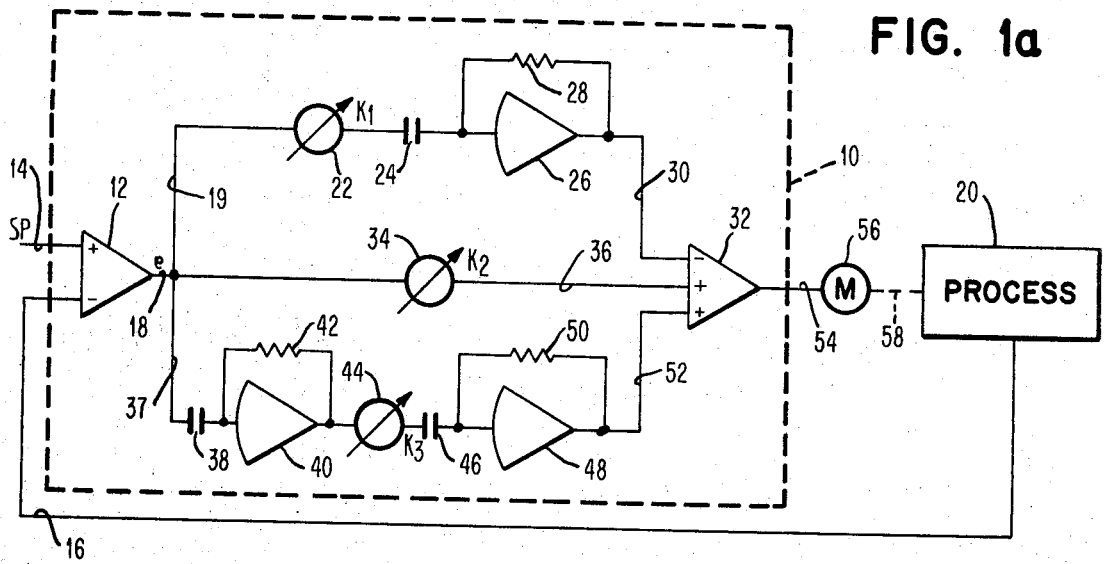
FIG. 1a is a circuit diagram in block form showing an analog control system for controlling a process in accordance with the invention.

The analog controller 10 of FIG. 1a includes an operational amplifier 12 for comparing the set point input as supplied on line 14 and the value of the measured variable as represented by the signal supplied on line 16 so as to produce on its output line 18 the control error; namely, the deviation of the measured variable of the process 20 from the set point value established for that measured variable. The control error is then utilized in three separate circuits for the computation of the proportional, reset and rate components of the control action.

The proportional component is computed by the circuit in the upper branch (line 19) and involves the multiplication of the proportional gain $K_1$ by the control error $e$, with the gain $K_1$ being set on potentiometer 22. The product $K_1 e$ is then differentiated with respect to time by the differentiating circuit which includes the capacitor 24 and the operational amplifier 26 with its feedback resistor 28. The result of the differentiation is then fed by way of line 30 as one input to the summing amplifier 32.

The reset component of the control action is computed by the central branch of the parallel circuits of the controller by merely multiplying the reset gain $K_2$ by the control error $e$. Potentiometer 34 is set to represent $K_2$ so that there is produced on line 36 the reset component $K_2 e$ which provides another input to the summing amplifier 32.

The rate component of the control action is supplied by the lower branch (line 37) of the control circuit which requires first a differentiation of the control error by the differentiating circuit including the capacitor 38 as well as the operational amplifier 40 and its feedback resistor 42. The resulting derivative of the control error with respect to time is now multiplied by the rate gain $K_3$ which is introduced by the setting of potentiometer 44 and the result of that multiplication is then differentiated by the differentiating circuit which includes the capacitor 46 and the operational amplifier 48 with its associated feedback resistor 50. There is then produced on line 52 the rate component of the control action which is also supplied as one input to the summing amplifier 32.

As is evident from FIG. 1a, the summing amplifier 32 sums up the proportional, reset and rate components to provide an output on line 54 which represents the velocity at which the motor 56, to which the line 54 is connected, should be operated to provide the appropriate control response. The signs shown at the inputs to amplifier 32 represent the polarity required for negative feedback on all components of the control signal. As shown in FIG. 1a, motor 56 is connected by a coupling shaft 58 to a control element such as a control valve or other unit (not shown) which forms a part of the apparatus in the process 20.

By carrying out the computations of the proportional, reset and rate components as separate computations and by then summing the resulting computed values when the computations are made in the order shown in the circuit diagram of FIG. 1a, there is then provided a control response by the motor 56 which will respond appropriately to any changes in the value of $K_1$, $K_2$ or $K_3$ which may result from modification of the respective potentiometers 22, 34 and 44 whenever the control error $e$ is not zero.

Figure 1B:
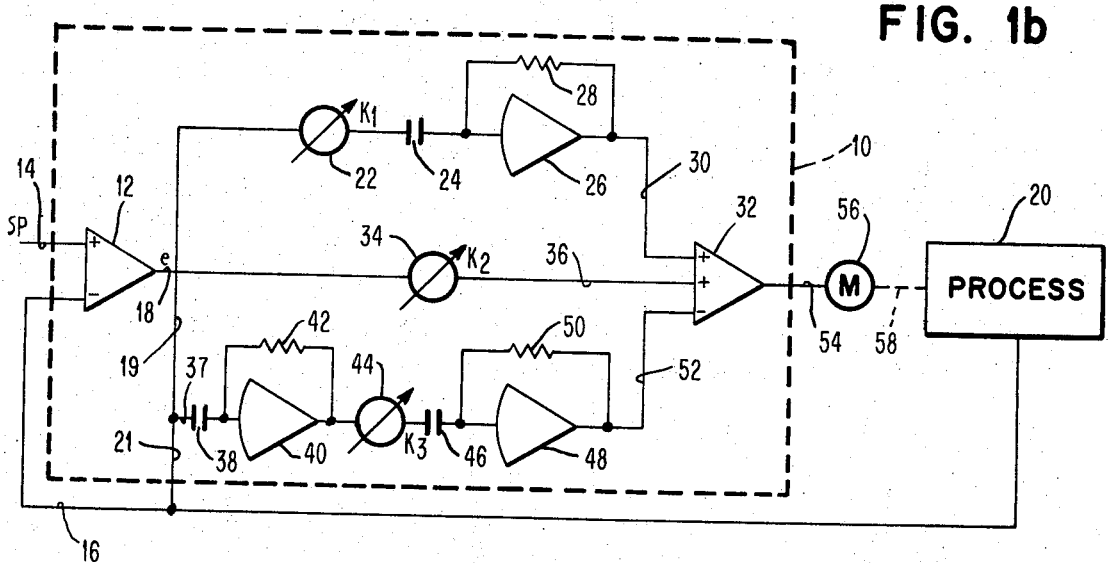
FIG. 1b is a circuit diagram in block form showing a modification of FIG. 1.

In FIG. 1b there is shown a modification of the analog control system of FIG. 1a which can be used to prevent an immediate proportional and rate response when the set point is changed. Instead of the proportional and rate response being calculated from the control error $e$, they are calculated from the measured variable as it appears on line 16. Thus, the lines 19 and 37 are connected to line 16 through line 21 instead of being connected to line 18. With this arrangement, the proportional and rate response to any change in set point will not occur until the measured variable has changed through the effect of the reset response resulting from the set point change. Obviously the rate response only can be isolated from changes in set point if line 19 is connected to line 18 and line 37 remains connected to line 16 through line 21.

An equivalent control response of the motor 56 may be provided by substituting a digital computer for the controller 10 of FIG. 1.

The calculations required for computing the magnitude of the output signal of the digital computer which is supplied to the motor or other control device on line 54 may be computed by a difference equation of the following form:

$$\Delta M_n = [K_{1,n} e_n - K_{1,n-1} e_{n-1}] + [K_{2,n} e_n] + [K_{3,n}(e_n - e_{n-1}) - K_{3,n-1}(e_{n-1} - e_{n-2})]$$

where:

$\Delta M_n =$ the change in position of the shaft 58 of motor 56 required in response to the sampled value of the process measurement under control at the $n^{th}$ sampling period.

$K_{1,n} =$ the proportional gain at the $n^{th}$ interval.
$K_{2,n} =$ the reset gain at the $n^{th}$ interval.
$K_{3,n} =$ the rate gain at the $n^{th}$ interval.
$e_n =$ the control error resulting from the measurement sampled at the $n^{th}$ interval.

The difference equation above is the sum of the three bracketed terms which respectively represent the proportional, reset and rate component of the control action required.

In the non-interacting form of the difference equation $K_{1,n} = K_{p,n}$
$K_{2,n} = T_c/T_{i,n}$
$K_{3,n} = T_{d,n}/T_c$ where:

$T_c =$ the time between samples of the measured variable.
$T_{i,n} =$ the integral time constant at the $n^{th}$ interval.
$T_{d,n} =$ the derivative time constant at the $n^{th}$ interval.
$K_{p,n} =$ the proportional coefficient at the $n^{th}$ interval.

In the gain interactive form of the equation set forth above, $K_{1,n} = K_{p,n}$
$K_{2,n} = K_{p,n} T_c/T_{i,n}$
$K_{3,n} = K_{p,n} T_{d,n}/T_c$ In a completely interactive form, the above difference equation has its gain factors calculated as follows:

$K_{1,n} = K_{p,n}(1 + L\, T_{d,n}/T_{i,n})$ where L is variable to modify the tuning.
$K_{2,n} = K_{p,n} T_c/T_{i,n}$
$K_{3,n} = K_{p,n} T_{d,n}/T_c$ Another form of the difference equation which can be utilized by a digital computer for computing the control signal is that which is developed by the several steps shown in FIG. 2. This form is an interacting form which is modified so as to provide filtering and compensation for sample degradation of the derivative component. The form of the difference equation developed in FIG. 2 results from the application of the present invention to the algorithm set forth by the inventors in their paper entitled, "Direct Digital Control Algorithm with Anti-Windup Feature," which was presented at the 22nd Annual ISA Conference in Chicago, Illinois, in Sept., 1967. The algorithm in that paper is set forth in equations 15-19 as follows:

$$\Delta M_n = \Delta P_n + \Delta I_n + \Delta D_n \qquad 15.$$
$$\Delta P_n = K_p (1 + T_d/T_i)(e_n - e_{n-1}) \qquad 16.$$
$$\Delta I_n = K_p (T_c/T_i) e_n \qquad 17.$$

$$\Delta D_n = 0.5 K_p [3 \Delta R_n - \Delta R_{n-1}] \qquad (18)$$

where, $$\Delta R_n = (T_d/T_c)(1 - \epsilon^{-T_c G/T_d})(e_n - 2e_{n-1} + e_{n-2}) + (\epsilon^{-T_c G/T_d}) \Delta R_{n-1} (\epsilon^{-T_c G/T_d}) \Delta R_{n-1} \qquad 19.$$

Figure 2:
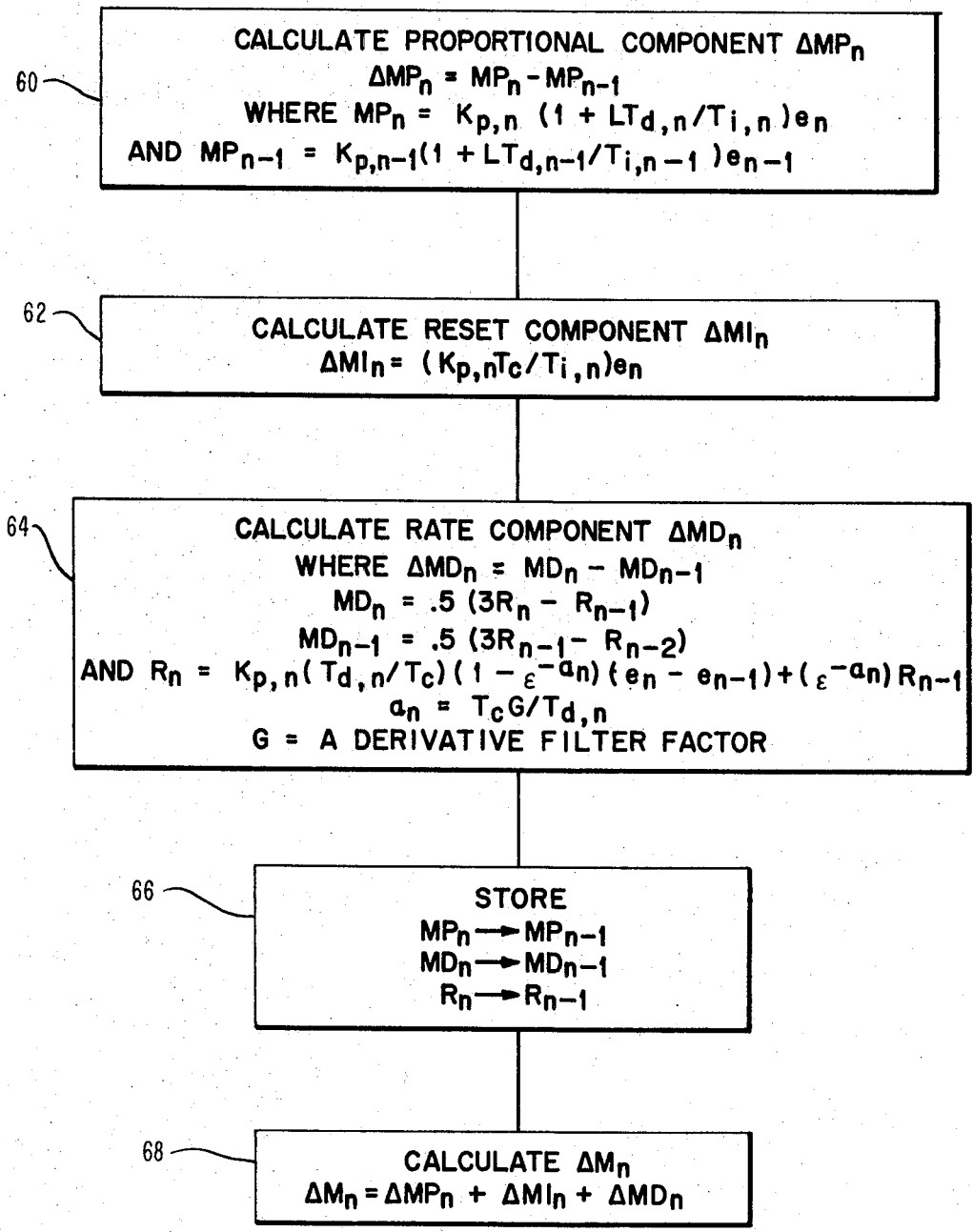
FIG. 2 is a list of the method steps as they may be carried out by a digital computer for the automatic computation of the control signal in accordance with the invention.

In FIG. 2 the first step of the process of computing the control signal is shown in block 60 which sets forth the mathematical relationships which must be solved to calculate the proportional component $\Delta MP_n$.

After the computation called for in block 60, the reset component is calculated as set forth in block 62 to provide the reset component $\Delta MT_n$. Then the rate component is calculated as set forth in block 64 to provide the term $\Delta MD_n$.

After the proportional, reset and rate components have been calculated in the respective steps described in blocks 60, 62 and 64, certain values are stored for use in the subsequent calculations, as shown in block 66. The storage involves the storing of the proportional component resulting from the $n^{th}$ sample of the measured value as the proportional component for the $n-1$ sample and a similar storing of the derivative component (rate action) and the value for $R_n$ as values for the $n-1$ sample.

The next step in the calculation of the control signal involves the summation of the results of the calculations made in the blocks 60, 62 and 64 to give a value $\Delta M_n$, as shown in block 68.

It will be noted that in the calculations of the various components in FIG. 2 the tuning coefficients, such as $K_p$, $T_d$ and $T_i$, in any term of the equation are those coefficients which are associated with the particular sampling periods to which the term of the equation applies, thus where the coefficients are multiplied by the control error $e_n$, the coefficients are then the coefficients which were applicable at the time of the $n^{th}$ sample, whereas when the coefficient is associated with the control error for a previous sample period, such as $e_{n-1}$, the coefficients are those which are applied at the time that the $n-1$ sample was taken.

The interacting form of the algorithm has been found to be one which has some advantages as far as ease of tuning is concerned. More particularly, the algorithm set forth in FIG. 2 has been found to be very useful in digital control systems since it not only provides for the ease of tuning which is available in the interacting form of the algorithm but also provides for the filtering and compensation for sample degradation which is also beneficial in digital control applications.

For the purpose of this application, both the analog differentiation and the difference terms of the equations solved by the digital computer shall be referred to as changes per unit of time. In the analog application both the change in the quantity being differentiated and time are continuous quantities, whereas in the digital application the change in the quantity and time are discrete changes which occur between samples of the measured variable being controlled.

It will be recognized by those skilled in the art that the motor 56 may be replaced by other integrating type control devices. That control device could, for example, be an integrating circuit providing an output signal representing position of the final control element.

What is claimed is:

1. The method for automatically calculating a control signal input for a control device of the integrating type so as to modify the manipulated variable altered by the control device to provide proportional and reset action in response to functions of the measured variable of the process being controlled, comprising the steps of
   automatically calculating the proportional component of said control signal in accordance with the change per unit of time in the value of the product of the proportional gain and a function of the measured variable,
   automatically calculating the reset component of said control signal in accordance with the product of the reset gain and a function of the measured variable, and
   automatically summing said components to produce said control signal.

2. The method of claim 1 in which the function of the measured variable used in calculating the proportional component is the value of the measured variable itself and the function used in calculating the reset component is the deviation of the measured variable from the set point.

3. The method of claim 1 in which the reset gain is a function of the proportional gain.

4. The method for controlling a manipulated variable by means of a control motor so as to provide proportional and reset response to a control error which responses are also modified by changes in the proportional or reset gain, comprising the steps of
   producing the proportional response in accordance with the change per unit of time in the value of the product of the proportional gain and said control error, and
   producing the reset response in accordance with the product of the reset gain and said control error.

5. The method for automatically calculating a control signal input for a control device of the integrating type so as to modify the manipulated variable altered by the control device to provide a proportional, reset and rate response to functions of the measured variable of the process being controlled, comprising the steps of
   automatically calculating the proportional component of said control signal in accordance with the change per unit of time in the value of the product of the proportional gain and a function of the measured variable,
   automatically calculating the reset component of said control signal in accordance with the product of the reset gain and a function of the measured variable which is the deviation of the variable from its set point,
   automatically calculating the rate component of said control signal in accordance with the change per unit of time of the product of the rate gain and the change of a function of the measured variable per unit of time, and
   automatically summing said components to produce said control signal.

6. The method of claim 5 in which the function of the measured variable for proportional and rate response is the deviation of the measured variable from its set point.

7. The method of claim 5 in which the function of the measured variable for the proportional and rate response is the measured variable itself.

8. The method of claim 5 in which the automatic calculation is carried out by a digital computer.

9. The method of claim 8 in which
   the proportional component is calculated in accordance with the equation
   $K_{p,n}[1 + LT_{d,n}/T_{i,n}] e_n - K_{p,n-1}[1 + LT_{d,n-1}/T_{i,n-1}] e_{n-1}$
   the reset component is calculated in accordance with the equation $[K_{p,n} T_c/T_{i,n}] e_n$, and
   the rate component is calculated in accordance with the equation $0.5 [3R_n - R_{n-1}] - 0.5 [3R_{n-1} - R_{n-2}]$
   where $R_n = K_{p,n} [T_{d,n}/T_c] [1 - \epsilon^{-a_n}] [e_n - e_{n-1}] + [\epsilon^{-a_n}] R_{n-1}$ and $a_n = T_c G/T_{d,n}$,
   $G$ is a derivative filter factor,
   $K_{p,n}$ is the proportional gain at the nth interval,
   $L$ is a variable to modify the tuning,
   $T_{d,n}$ is the derivative time constant at the nth interval,
   $T_{i,n}$ is the integral time constant at the nth interval,
   $e_n$ is the control error resulting from the measurement sampled at the nth interval,
   $T_c$ is the time between samples of the measured variable, and
   $\epsilon$ is the naperian logarithm base.

10. The method of claim 8 in which
    the reset gain is computed as the product of a proportional coefficient and the sampling period time divided by the reset time constant, and the rate gain is computed as the product of the proportional coefficient and the rate time constant divided by the sampling period time.

11. The method of claim 10 in which
the proportional gain is computed as the product of the proportional coefficient and the quantity, unity plus the product of a tuning constant and the quotient of the rate time constant and the reset time constant.

12. The method of claim 8 in which
the reset gain is computed as the quotient of the sampling period time and the reset time constant, and
the rate gain is computed as the quotient of the rate time constant and the sampling period time.

13. The method for controlling a manipulated variable by means of an integrating type control device so as to provide proportional, reset and rate responses to a control error, which responses are also modified by changes in the proportional or reset gain, comprising the steps of producing the proportional response in accordance with the change per unit of time in the value of the product of the proportional gain and said control error, producing the reset response in accordance with the product of the reset gain and said control error, and producing the rate response in accordance with the change per unit of time of the product of the rate gain and the change of said control error per unit of time.

* * * * *

PO-1050
(5/69)

UNITED STATES PATENT OFFICE
CERTIFICATE OF CORRECTION

Patent No. 3,770,946    Dated 11/6/73

Inventor(s) Harry A. Fertik and Charles W. Ross

It is certified that error appears in the above-identified patent and that said Letters Patent are hereby corrected as shown below:

Col. 3, line 52,    That part of the equation within the last set of parentheses should read
$$(e_{n-1} - e_{n-2})$$

Col. 4, line 46,    Equation should read as follows:
$$\Delta R_n = (T_d/T_c)(1 - \varepsilon^{-T_c G/T_d})(e_n - 2e_{n-1} + e_{n-2}) + (\varepsilon^{-T_c G/T_d}) \Delta R_{n-1}$$

Col. 4, line 53,    "$\Delta MT_n$" should read --$\Delta MI_n$--.

Col. 6, line 47,    "$e_n^-$" should read --$e_{n-1}$--.

Signed and sealed this 10th day of December 1974.

(SEAL)
Attest:

McCOY M. GIBSON JR.
Attesting Officer

C. MARSHALL DANN
Commissioner of Patents